(12) United States Patent
Minagawa

(10) Patent No.: US 6,710,492 B2
(45) Date of Patent: Mar. 23, 2004

(54) CONCENTRICALLY ARRANGED SINGLE STATOR DUAL ROTOR MOTOR/ GENERATOR

(75) Inventor: Yuusuke Minagawa, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/758,131

(22) Filed: Jan. 12, 2001

(65) Prior Publication Data

US 2001/0008354 A1 Jul. 19, 2001

(30) Foreign Application Priority Data

Jan. 17, 2000 (JP) ........................ 2000-007431
Dec. 18, 2000 (JP) ........................ 2000-383547

(51) Int. Cl.$^7$ .................. H02K 47/04; H02K 47/14; H02K 47/20; H02K 16/00; H02K 16/02
(52) U.S. Cl. .................. 310/113; 310/114; 310/115; 310/118; 310/152
(58) Field of Search ........................ 310/113–115, 118, 310/152

(56) References Cited

U.S. PATENT DOCUMENTS

| | | | | |
|---|---|---|---|---|
| 3,462,626 A | * | 8/1969 | Kluss ........................ 310/114 |
| 3,898,490 A | * | 8/1975 | Wedman ........................ 310/52 |
| 4,171,496 A | * | 10/1979 | Eriksson ........................ 310/219 |
| 4,503,349 A | * | 3/1985 | Miller ........................ 310/178 |
| 4,532,447 A | * | 7/1985 | Cibié ........................ 310/114 |
| 4,749,898 A | * | 6/1988 | Suzuki et al. ........................ 310/114 |
| 4,782,257 A | * | 11/1988 | Secher et al. ........................ 310/114 |
| 4,785,213 A | | 11/1988 | Satake ........................ 310/116 |
| 4,859,205 A | * | 8/1989 | Fritz ........................ 439/492 |
| 5,117,141 A | * | 5/1992 | Hawsey et al. ........................ 310/114 |
| 5,124,606 A | * | 6/1992 | Eisenbeis ........................ 310/114 |
| 5,418,413 A | | 5/1995 | Satomi ........................ 310/12 |
| 5,525,851 A | * | 6/1996 | Kumamoto et al. ........................ 310/114 |
| 5,668,430 A | | 9/1997 | Kolomeitsev ........................ 310/266 |
| 5,793,136 A | * | 8/1998 | Redzic ........................ 310/114 |
| 5,936,312 A | | 8/1999 | Koide et al. ........................ 290/40 R |
| 6,005,317 A | * | 12/1999 | Lamb ........................ 310/103 |
| 6,049,152 A | * | 4/2000 | Nakano ........................ 310/114 |
| 6,121,705 A | * | 9/2000 | Hoong ........................ 310/113 |
| 6,211,597 B1 | * | 4/2001 | Nakano ........................ 310/266 |
| 6,304,017 B1 | * | 10/2001 | Leupold ........................ 310/115 |
| 6,355,999 B1 | * | 3/2002 | Kichiji et al. ........................ 310/112 |
| 6,501,190 B1 | * | 12/2002 | Seguchi et al. ........................ 290/46 |
| 6,531,799 B1 | * | 3/2003 | Miller ........................ 310/114 |
| 6,570,278 B1 | * | 5/2003 | Falanga ........................ 310/68 R |
| 6,577,022 B2 | * | 6/2003 | Joong et al. ........................ 290/40 C |
| 6,577,037 B2 | * | 6/2003 | Killen et al. ........................ 310/114 |

FOREIGN PATENT DOCUMENTS

| | | |
|---|---|---|
| EP | 0 945 965 A1 | 9/1999 |
| JP | 11-275826 | 10/1999 |
| WO | WO 98/50998 | 11/1998 |

* cited by examiner

Primary Examiner—Tran Nguyen
Assistant Examiner—Pedro J. Cuevas
(74) Attorney, Agent, or Firm—Foley & Lardner

(57) ABSTRACT

The motor/generator according to this invention is provided with a first rotor (23), a second rotor (21) and a stator (22) provided with a plurality of stator coils (1–6). The first rotor (23) is provided with magnetic poles by a magnet. The second rotor (21) is provided with magnetic poles by a magnet and a plurality of rotor coils (A–D). The motor/ generator functions as a magnetic coupling by creating an equal number of magnetic poles in the first rotor (23) and the second rotor (21). When the first rotor (23) and the second rotor (21) are rotated by supplying a polyphase alternating current to the stator coils (1–6), a part of the rotor coils (A–D) are excited and the number of magnetic poles of the second rotor (21) is varied to allow independent rotation of the first rotor (23) and the second rotor (21).

14 Claims, 13 Drawing Sheets

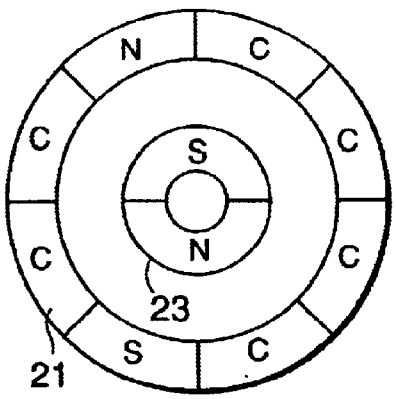
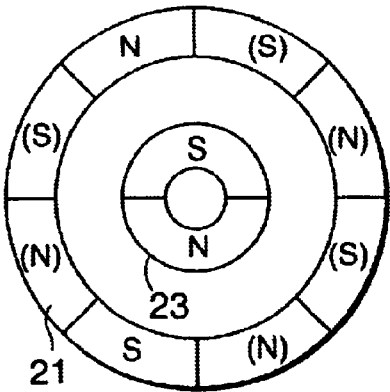
FIG. 8A         FIG. 8B
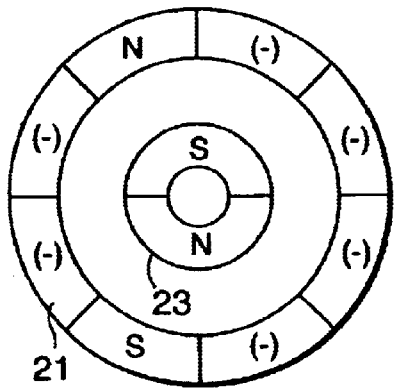
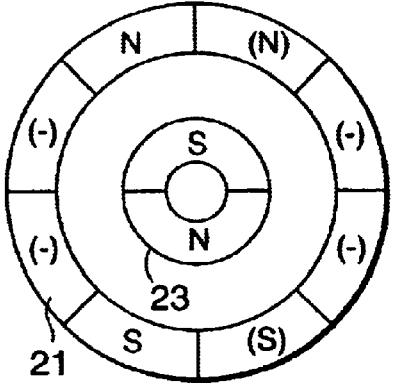
FIG. 8C         FIG. 8D
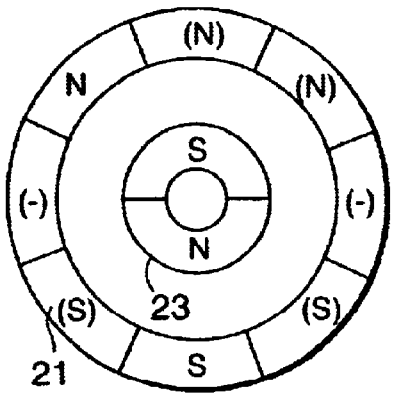
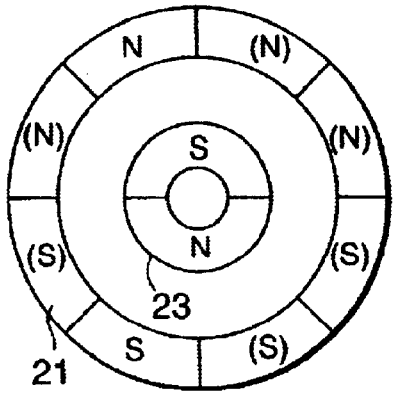
FIG. 8E         FIG. 8F

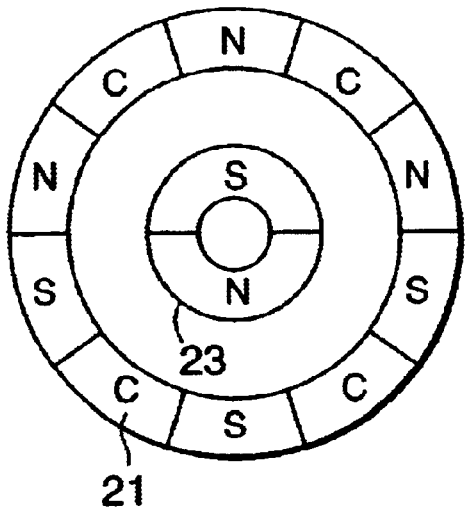
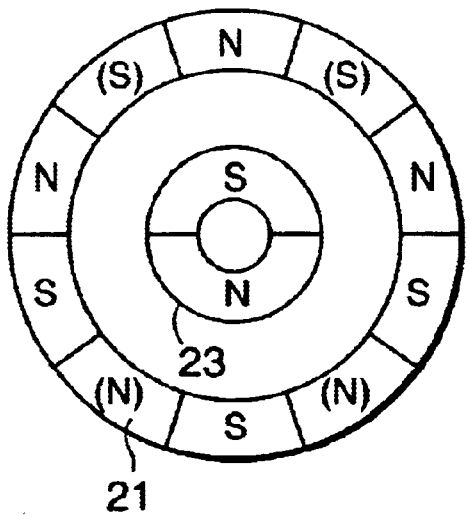
FIG. 11A            FIG. 11B
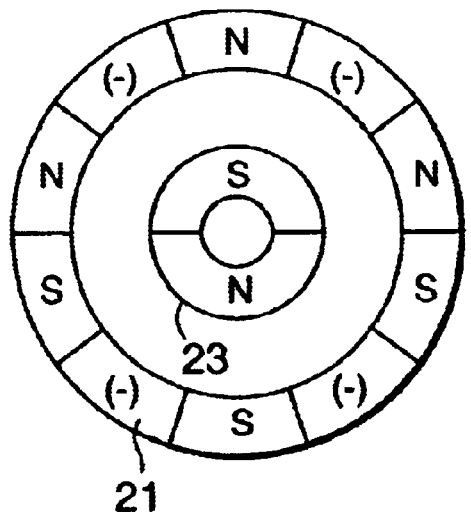
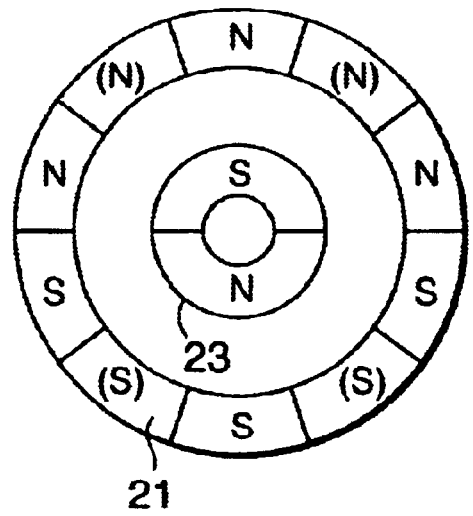
FIG. 11C            FIG. 11D

CONCENTRICALLY ARRANGED SINGLE STATOR DUAL ROTOR MOTOR/GENERATOR

FIELD OF THE INVENTION

This invention relates to a composite motor/generator driving two rotors with a single stator.

BACKGROUND OF THE INVENTION

Tokkai Hei 11-275826 published by the Japanese Patent Office in 1999 discloses a motor/generator which drives a plurality of rotors by applying a composite polyphase current to a set of stator coils. The invention of Tokkai Hei 11-275826 was filed to United States Patent Office as patent application Ser. No. 09/275,785 filed on Mar. 25, 1999 before the priority date of this invention and was granted as U.S. Pat. No. 6,049,152 after the priority date of this invention.

In this motor/generator, the composite polyphase alternating current comprising phases with a fixed phase difference is supplied from an inverter to coils of each phase in the stator. This prior art discloses a motor/generator with a ratio of magnetic poles for the two rotors of 1:, 2:1 or 3:1.

SUMMARY OF THE INVENTION

When the ratio of magnetic poles in the magnets of the two rotors is 1:1, it is possible to rotate a first rotor directly with the rotation of a second rotor by utilizing a magnetic coupling effect without applying a current to the stator coils.

Conversely this also means that when the second rotor is rotated, the first rotor may undergo unintended rotation.

A hybrid vehicle couples the drive force of an engine and a motor to charge a battery and drive the vehicle.

In the hybrid vehicle using the above type of motor/generator, when one of the rotors is rotated by the engine for charging the battery in a state when the vehicle is not moving, the other rotor and a propeller shaft of the vehicle coupled therewith may also be rotated. This operation may therefore result in an unintentional movement of the vehicle. When on the other hand, the rotor connected to the propeller shaft is driven for the vehicle start, the other motor connected to the engine is also rotated irrespective of the state of charge of the battery. This operation may result in an unnecessary engine operation.

Further, when the two rotors of which the ratio of magnetic poles of the magnets is 1:1 are driven as motors by supplying a composite polyphase current to the stator coils, it is difficult to control the rotation of the two rotors independently.

It is therefore an object of this invention to generate magnetic coupling while preventing unintended rotation of the rotor.

It is a further object of this invention to enable independent rotation control two rotors of which the ratio of magnetic poles of the magnets is 1:1 by supplying a composite polyphase alternating current to a single set of stator coils.

In order to achieve the above objects, this invention provides a motor/generator comprising a first rotor provided with a plurality of magnetic poles by a magnet, a second rotor provided with a plurality of magnetic poles by a magnet and a plurality of rotor coils, and a stator provided with a plurality of stator coils applying a rotational force on the first rotor and the second rotor when a composite polyphase alternating current is supplied to the stator coils.

This invention also provides a motor/generator comprising a first rotor provided with a plurality of magnetic poles by a magnet, a second rotor provided the same number of magnetic poles as the first rotor by a magnet, a stator provided with a plurality of stator coils applying a rotational force on the first rotor and the second rotor when a composite polyphase alternating current is supplied to the stator coils, and a device which limits the rotation of the second rotor in a specified direction.

The details as well as other features and advantages of this invention are set forth in the remainder of the specification and are shown in the accompanying drawings.

BRIEF DESCRIPTION OF THE DRAWING

FIGS. 8A–8F are schematic cross-sectional views of the motor/generator showing yet further variations of the disposition of the rotor coils and the magnets of the outer rotor.

FIGS. 11A–11D are schematic cross-sectional views of the motor/generator showing yet further variations of the disposition of the rotor coils and the magnets of the outer rotor.

DESCRIPTION OF THE PREFERRED EMBODIMENTS

Figure 1:
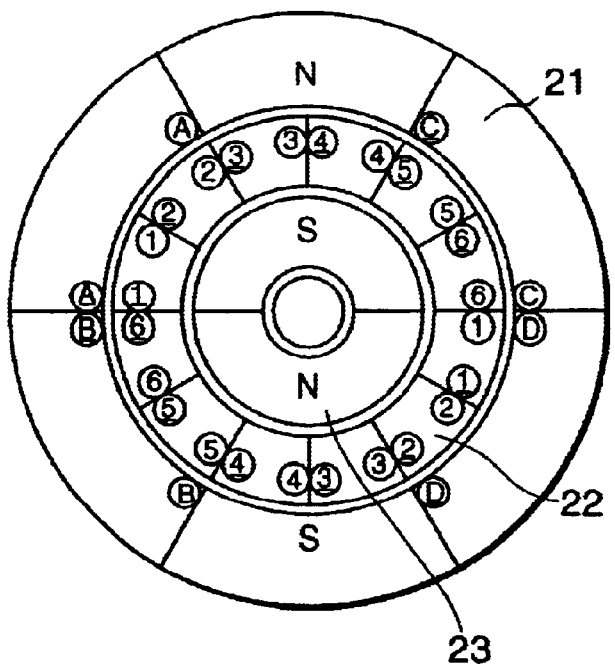
FIG. 1 is a schematic cross-sectional view of a motor/generator according to this invention.

Referring to FIG. 1 of the drawings, a motor/generator according to this invention is provided with a stator 22 and two rotors 21 and 23 which are coaxially disposed. The stator 22 is cylindrical in cross section and is provided with twelve stator coils 1–6 disposed at equal angular intervals. An inner rotor 23 is disposed inside the stator 22 and an outer rotor 21 is disposed outside the outer side of the stator 22. The inner rotor 23 comprises a magnet having a pair of magnetic poles, i.e., an N pole and an S pole. The outer rotor 21 is provided with a magnet having a pair of the magnetic poles and four rotor coils A, B, C and D.

Both a coil number and a reference numeral in the figure are provided in order to describe the flow of current in these coils. Underlined numbers and reference numerals designate current flow in a direction opposite to that in coils designated by numbers or reference numerals which are not underlined. Thus a single coil is expressed by a pair of numbers comprising an underlined number and a non-underlined number. In contrast, in FIGS. 2A and 2B, a single coil is designated by a single coil number. Underlined coil numbers designate current flow in a direction opposite to that in coils of the same coil number which are not underlined. That is to say, an alternating current with an opposite phase is supplied to coils comprising the pair.

Disposing two rotors on the inner side and the outer side of a single stator and supplying a composite polyphase alternating current to the stator coils is disclosed in U.S. patent application Ser. No. 09/275,785 (U.S. Pat. No. 6,049, 152) which is herein incorporated by reference.

Figure 3:
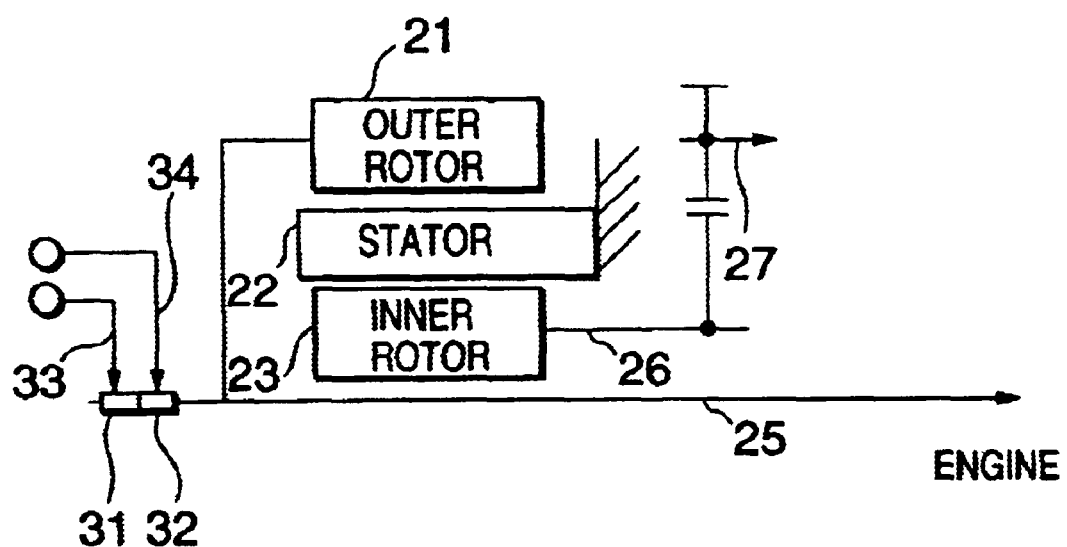
FIG. 3 is a schematic diagram of a vehicle drive device using the motor/generator.

The composite polyphase alternating current is supplied from the control circuit shown in FIG. 3 and FIG. 4 of U.S. patent application Ser. No. 09/275,785 to the twelve stator coils 1–6.

In this motor/generator, the ratio of pairs of magnetic poles of the outer rotor 21 and the inner rotor 23 when the rotor coils A, B, C, D are not excited is 1:1. A drive force $f_1$ which is applied to the half the periphery of the outer rotor 21 and a drive force $f_2$ which is applied to half the periphery of the inner rotor 23 is expressed by the following equations (1) and (2) corresponding to Equations (8) and (9) in U.S. patent application Ser. No. 09/275,785. In the following description, the magnet of the outer rotor 21 is termed the outer magnet and the magnet of the inner rotor 23 is termed the inner magnet.

$$f_1 = -lm_1 \cdot \left[ \mu \cdot lm_2 \cdot \sin\{(\omega_2 - \omega_1) \cdot t - \alpha\} - \frac{3}{2} \cdot \mu \cdot n \cdot lc \cdot \sin\beta \right] \quad (1)$$

$$f_2 = \mu \cdot lm_2 \cdot \left[ lm_1 \cdot \sin\{(\omega_1 - \omega_2) \cdot t - \alpha\} - \frac{3}{2} \cdot n \cdot lc \cdot \sin\{(\omega_1 - \omega_2) \cdot t - \alpha - \beta\} \right] \quad (2)$$

Where, $Bm_1$, $Bm_2$=magnetic flux amplitudes,
$\mu$=magnetic permeability,
$Im_1$=equivalent direct current of outer magnets,
$Im_2$=equivalent direct current of inner magnets,
Ic=amplitude of alternating currents supplied to stator coils,
$\omega_1$=rotational angular velocity of outer magnet,
$\omega_2$=rotational angular velocity of inner magnet,
$\alpha$=phase difference of outer and inner magnets (when t=0),
$\beta$=phase difference of stator coils,
t=elapsed time from time when phase of outer magnets and stator coil coincided, and
n=coil constant.

The drive force $f_1$ and $f_2$ when a current Ic is supplied to the stator coils will now be discussed.

The drive forces $f_1$, $f_2$ created by the current Ic·sin β which is applied to the outer rotor 21 and the inner rotor 23 are varied depending on a phase difference $\alpha$ of the outer magnet and the inner magnet. The description below is divided into the case when $\alpha$ is equal to zero and when $\alpha$ is equal to $\pi$.

Figure 2A:
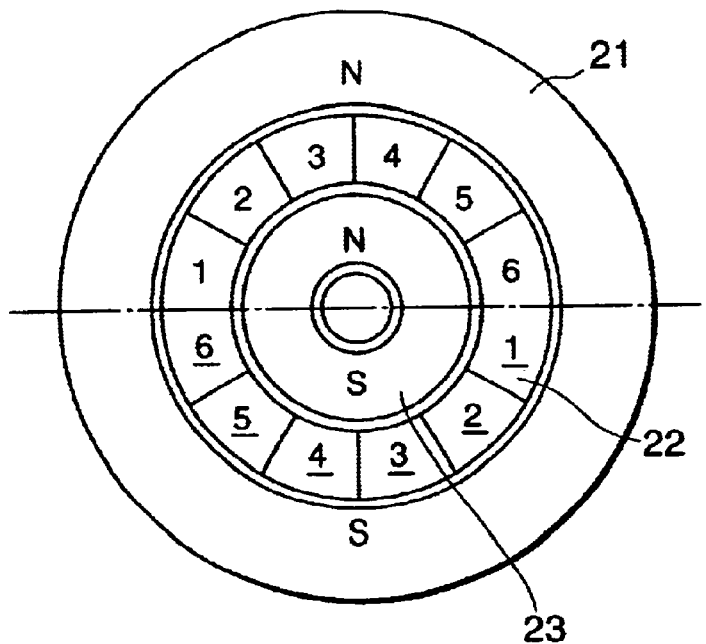
FIGS. 2A and 2B are schematic cross-sectional views of the motor/generator describing specific rotation positions.
Figure 2B:
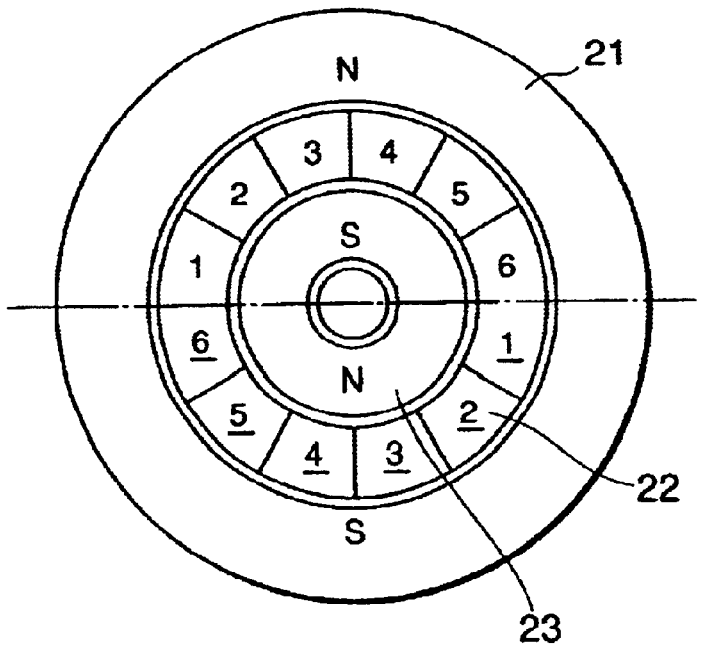

Referring now to FIG. 2A, when $\alpha$ is equal to zero, similar poles in the outer rotor 21 and the inner rotor 23 are aligned. That is to say, N pole faces N pole and S pole faces S pole. Referring to FIG. 2B, when $\alpha$ is equal to $\pi$, dissimilar poles in the outer rotor 21 and the inner rotor 23 are aligned. That is to say, N pole faces S pole and S pole faces N pole.

In order to simplify the equation, Equations (1) and (2) may be rewritten as Equations (3) and (4) providing that $\omega_1$ equals $\omega_2$.

$$f_1 = -\mu \cdot lm_1 \cdot \left\{ lm_2 \cdot \sin(-\alpha) - \frac{3}{2} \cdot n \cdot lc \cdot \sin\beta \right\} \quad (3)$$

$$f_2 = \mu \cdot lm_2 \cdot \left\{ lm_1 \cdot \sin(-\alpha) - \frac{3}{2} \cdot n \cdot lc \cdot \sin(-\alpha - \beta) \right\} \quad (4)$$

When $\alpha$ equals zero, Equations (3) and (4) may be rewritten as Equations (5) and (6).

$$f_1 = \mu \cdot lm_1 \cdot \frac{3}{2} \cdot n \cdot lc \cdot \sin\beta \quad (5)$$

$$f_2 = \mu \cdot lm_2 \cdot \frac{3}{2} \cdot n \cdot lc \cdot \sin\beta \quad (6)$$

Thus providing that $\mu \cdot Im_1$ equal $\mu \cdot Im_2$, $f_1$, equals $f_2$. Since $f_1$ equals $f_2$ when $\alpha$ equals zero, the outer rotor 21 and the inner rotor 23 are driven in the same direction and thus rotate in the same direction. This is termed positive rotation mode.

On the other hand, when $\alpha$ equals $\pi$, Equations (3) and (4) may be rewritten as Equations (7) and (8).

$$f_1 = m \cdot lm_1 \cdot \frac{3}{2} \cdot n \cdot lc \cdot \sin\beta \quad (7)$$

$$f_2 = -\mu \cdot lm_2 \cdot \frac{3}{2} \cdot n \cdot lc \cdot \sin\beta \quad (8)$$

Thus providing that $\mu \cdot Im_1$ equal $\mu \cdot Im_2$, $f_1$ equals $f_2$. That is to say, forces are exerted on the outer rotor 21 and the inner rotor 23 in opposite directions and they rotate in opposite directions, This is termed reverse rotation mode.

When the ratio of pairs of magnetic poles is 1:1, both the outer rotor 21 and the inner rotor 23 rotate when a current Ic is supplied to the stator coil. Furthermore the direction of rotation of the rotors 21 and 23 varies due to the phase difference a of the two rotors 21 and 23. That is to say, when the ratio of pairs of magnetic poles is 1: 1, it is not possible to independently control the rotation of the outer rotor 21 and the inner rotor 23.

Next, the situation when a current does not applied to the stator coil, i.e., when Ic equals zero will now be described. When Ic equals zero, Equations (1) and (2) may be rewritten as Equations (9) and (10).

$$f_1 = -\mu \cdot lm_1 \cdot lm_2 \cdot \sin\{(\omega_2 - \omega_1) \cdot t - \alpha\} \quad (9)$$

$$f_2 = \mu \cdot lm_2 \cdot lm_1 \cdot \sin\{(\omega_1 - \omega_2) \cdot t - \alpha\} \quad (10)$$

Equations (9) and (10) may be rewritten as Equations (11) and (12), if we assume that $\omega_1$ equals $\omega_2$.

$$f_1 = -\mu \cdot lm_1 \cdot lm_2 \cdot \sin(-\alpha) \quad (11)$$

$$f_2 = \mu \cdot lm_2 \cdot lm_1 \cdot \sin(-\alpha) \quad (12)$$

The relationship $f_1$ equals $-f_2$ is always satisfied on this basis. This relationship may appear to result in the outer rotor 21 and the inner rotor 23 rotating in opposite directions. However, in the reality, when a phase difference α is applied to the outer rotor 21 and the inner rotor 23, a force results which tends towards the position at which α equals zero. That is to say, when a mechanical force is applied to one rotor from the outside, a correcting drive force $f_1$ is generated due to the fact that a deviates from zero. In the same manner, a drive force $f_2$ is applied to the other rotor in an opposite direction. Thus when one rotor is mechanically rotated from the outside, the other rotor rotates in the same direction. This exemplifies the principle of magnetic coupling. That is to say, when, for example, the outer rotor 21 is driven by the engine 1 with no current flowing in the stator coils 1–6, the inner rotor 23 rotates in the same direction.

Thus when the ratio of magnetic poles is 1:1, the phase difference α of the two rotors is zero and a current is not applied to the stator coils, if one rotor is driven mechanically from the outside, it is possible to drive the other rotor using magnetic coupling at the same speed. That is to say, it is possible to directly link the two rotors.

The application of this motor/generator to a hybrid vehicle will now be described. The situation will be described in which electricity generated by a first rotor on being driven by the engine is applied as a current to the stator coils and drives a second rotor which is linked to a propeller shaft of the vehicle.

For example, when the engine and the vehicle are stopped and a current is supplied to the stator coils from the battery to drive the vehicle by the rotations of the second rotor, the first rotor which is linked to the engine also rotates. Conversely, when the engine is started in order to charge the battery while the vehicle is stopped by supplying a current to the stator coils from the battery to drive the first rotor, the second rotor rotates at the same time and the vehicle may be caused to move.

That is to say, when the magnetic pole ratio of the two rotors is 1:1, it is possible to use the motor/generator via magnetic coupling. On the other hand, when an alternating current is supplied to the stator coils, it becomes difficult to drive the two rotors independently.

Referring again to FIG. 1, this motor/generator solves the above problem by varying the ratio of magnetic poles of the outer rotor 21 and the inner rotor 23 by increasing the magnetic pole number of the outer rotor 21 by exciting four rotor coils A, B, C, D provided in the outer rotor 21. The outer rotor 21 and the inner rotor 23 may be a Surface Permanent Magnet (SPM) type or an Internal Permanent Magnet (IPM) type. The stator coils 1–6 of the stator 22 are formed by concentrated winding.

Referring to FIG. 3, an exciting current is supplied to the rotor coils A, B, C, D through collector rings 31, 32 and brushes 33, 34. A rotation shaft 25 of the outer rotor 21 is linked to an output shaft of the engine (not shown). A rotation shaft 26 of the inner rotor 23 is linked to a propeller shaft 27 of the vehicle.

Figure 4A:
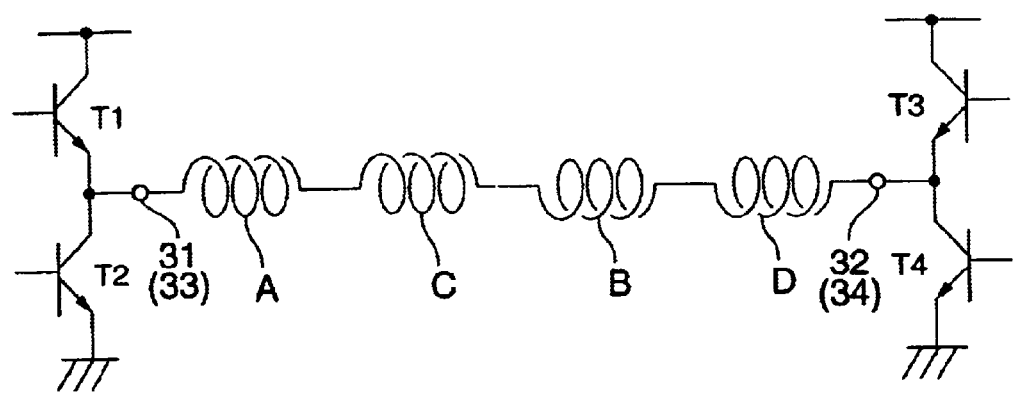
FIGS. 4A and 4B are circuit diagrams of a current supply circuit to a plurality of rotor coils according to this invention.

Referring to FIG. 4A, the rotor coils A–D are connected in series in the sequence A, C, B, D. However the rotor coils A and C are wound in the same direction and the rotor coils B and D are wound in the opposite direction. The exciting current of the rotor coils A–D is a direct current (DC current) and is supplied by a DC circuit shown in FIG. 4A or a DC circuit shown in FIG. 4B. The DC circuit in FIG. 4A comprises four transistors T1, T2, T3, T4. The transistors T1 and T2 are connected in series and their connection points are connected to an end of the rotor coil A through the brush 33 and collector ring 31 in FIG. 3. The transistors T3 and T4 are connected in series in the same manner, and their connection points are connected to an end of the rotor coil D through the brush 34 and collector ring 32 in FIG. 3.

The collectors of the transistors T1 and T3 are respectively connected to the battery. The emitters of the transistor T2 and T4 are connected respectively to an earth.

A direct current from the battery flows to the earth from the transistor T1 via the rotor coils A, C, B, D through the transistor T4 as a result of supplying an OFF signal to the bases of the transistors T2 and T3 and supplying an ON signal to the bases of the transistors T1 and T4. As a result, the rotor coils A, C, B, D are excited. The direction of the connections of the rotor coils A–D is pre-set so that the excited rotor coils A and C form an N pole and the excited rotor coils B and D form an S pole. Thus the semi-circular periphery of the outer rotor 21 forms the N pole and the remaining semicircular periphery forms the S pole. That is to say, the number of pairs of magnetic poles of the outer rotor 21 is one and the magnetic pole ratio of the outer rotor 21 and the inner rotor 23 is 1:1.

On the other hand, a DC current from the battery flows to the earth from the transistor T3 via the rotor coils D, B, C, A through the transistor T2 as a result of supplying an OFF signal to the bases of the transistors T1 and T4 and an ON signal to the bases of the transistors T2 and T3. As a result, the excited rotor coils A and C form an S pole and the excited rotor coils B and D form an N pole. Thus the N poles and the S poles of the outer rotor 21 alternate at 60-degree intervals. That is to say, the ratio of pairs of magnetic poles of the outer rotor 21 becomes three and the ratio of magnetic poles of the outer rotor 21 and the inner rotor 23 becomes 3:1.

In this manner, it is possible to arbitrarily vary the ratio of magnetic poles between ratios of 3:1 and 1:1 by varying the direction of the DC current supplied to the rotor coils A–D by the circuit shown in FIG. 4A.

When the motor/generator is used as a motor or as a generator by supplying a current to the stator coils 1–6, a DC current is supplied from the rotor coils D to the rotor coils A and thus the outer rotor 21 and the inner rotor 23 have a ratio of magnetic poles of 3:1. In this case, it is possible to drive the outer rotor 21 and the inner rotor 23 in a substantially independent manner by supplying a composite polyphase alternating current to the stator coils 1–6 as disclosed in U.S. patent application Ser. No. 09/275,785 (U.S. Pat. No. 6, 049, 152). In this case, reverse rotation mode does not result in the rotation of the rotors 21 and 23. The rotors 21 and 23 rotate together with the rotating magnetic field created by the stator coils 1–6 in the rotors 21 and 23.

On the other hand, when the motor/generator is used as a magnetic coupling, a DC current is supplied from the rotor coil A to the rotor coil D and the ratio of magnetic poles of the outer rotor 21 and the inner rotor 23 is set to 1:1. In this case, one rotor rotates in response to the rotation of the other rotor.

It should be noted that when an exciting current is not applied to the rotor coils A–D, the number of pairs of magnetic poles of the outer rotor 21 is 1. Thus the option is created of not supplying an exciting current to the rotor coils A–D when the motor/generator is used for a magnetic coupling. However the strength of the magnetic coupling increases with a DC current flowing from the rotor coil D to the rotor coil A. Furthermore it is possible to arbitrarily set the strength of the magnetic coupling by the voltage of the DC current flowing through the rotor coils A–D.

Figure 4B:
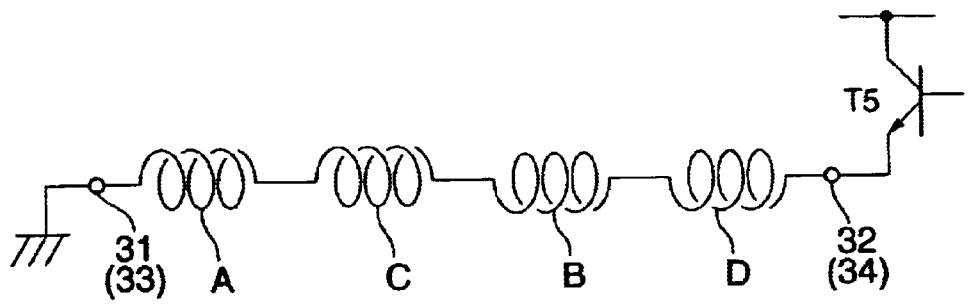

It is possible to use a simple DC circuit as shown in FIG. 4B by altering the structure of the DC circuit shown in FIG. 4A.

Such a circuit connects the collector ring 31 to an earth through a brush 33. The collector ring 32 is connected to the emitter of the transistor T5 through the brush 34.

The battery is connected to the collector of the transistor T5. The connection of the rotor coils A–D is the same as that of the DC circuit shown in FIG. 4A.

When an ON signal is supplied to the base of the transistor T5, a DC current flows from the rotor coils D to the rotor coil A. The excited rotor coils A and B respectively form an S pole and the excited rotor coils B and D respectively form an N pole. As a result, the outer rotor 21 and the inner rotor 23 have a ratio of magnetic poles of 3:1.

On the other hand, when an OFF signal is supplied to the base of the transistor T5, a current is not applied to the rotor coils A–D and the number of pairs of magnetic poles of the outer rotor remains at 1.

Thus when it is not necessary to vary the strength of the magnetic coupling, the DC circuit shown in FIG. 4B, that has a simple structure, may be used instead of the DC circuit shown in FIG. 4A.

The number of coils in the rotor coil provided in the outer rotor 21 is not limited to four. When the rotor coil number provided in the outer rotor 21 is taken to be 2n where n is a natural number, the ratio of magnetic poles of the outer rotor 21 and the inner rotor 23 is (n+1):1. Thus it is possible to arbitrarily set the ratio of magnetic poles by varying the number of rotor coils provided in the outer rotor 21. Furthermore it is possible to vary the ratio of the magnetic poles in this manner even when the rotor coils varying the number of pairs of magnetic poles are provided in the inner rotor 23 instead of the outer rotor 21.

In this manner, it is possible to utilize the advantages of magnetic coupling and to prevent unintended rotation of the outer rotor 21 and the outer rotor 23 when a current is supplied to the stator coils 1–6, by varying the ratio of magnetic poles of the outer and inner rotors 21 and 23 according to operational conditions of the vehicle.

For example, when starting the vehicle, or starting the engine while the vehicle is stopped, the ratio of magnetic poles is set to 3:1. In this manner, since it is possible to independently control the outer rotor 21 and the inner rotor 23, when the vehicle is started by rotating the inner rotor 23 with battery power, the engine does not rotate unexpectedly. Alternatively using the outer rotor 21 to start the engine as a starter motor does not result in the inner rotor 23 rotating and the vehicle moving.

When the vehicle is running, the ratio of the magnetic poles is set to 3:1, the outer rotor 21 is rotated by the engine output and is driven as a generator. The inner rotor 23 is driven by the generated power of the generator. In this case, it is possible to adapt the operation of the motor/generator to low speed/high torque and high speed/low torque operation by controlling the rotation speed or torque of the inner rotor 23 through the control of the composite polyphase alternating current.

It is also possible to control the motor/generator so that output power=rotation speed×torque is always constant.

When the vehicle is running, it is possible to set the ratio of magnetic poles to 1:1 so as to use the motor/generator as a magnetic coupling. In this situation, for example, if the outer rotor 21 is driven by the engine, it is possible to drive the inner rotor 23 at the same speed as the outer rotor 21 without supplying current to the stator coils 1–6.

Further, if current control is performed on the rotor coils A–D of the outer rotor 21 according to the size of the transmitted torque by the magnetic coupling synchronous operation of the inner rotor 21 and the outer rotor 23 can be continued even during variations in transmitted torque. When the ratio of magnetic poles is switched from 3:1 to 1:1, the voltage applied to the rotor coils A–D of the outer rotor 21 inverts. The voltage after the inversion may be determined according to the transmitted torque.

When the rotors 21, 23 are rotated in a state where they are stationary, a current is supplied to the stator coils 1–6 so that the ratio of magnetic poles is set to 3:1 preceding the current supply to the stator coils 1–6.

By this operation, the reverse rotation of the rotor 21 or the rotor 23 is prevented. When it is desired to drive only one rotor, an unintended movement of the other rotor is prevented by the control of the composite polyphase alternating current supplied to the stator coils. 1–6.

The embodiment above described is the case in which the ratio of magnetic poles of the outer rotor 21 and the inner rotor 23 is switched between 3:1 and 1:1 according to exciting or non-exciting of the rotor coils A–D. This invention allows for several variations on the disposition and number of rotor magnets, the number of rotor coils and the construction of the DC circuit for exciting the rotor coils.

These variations will be described referring to FIGS. 5A–13E.

Figure 5A:
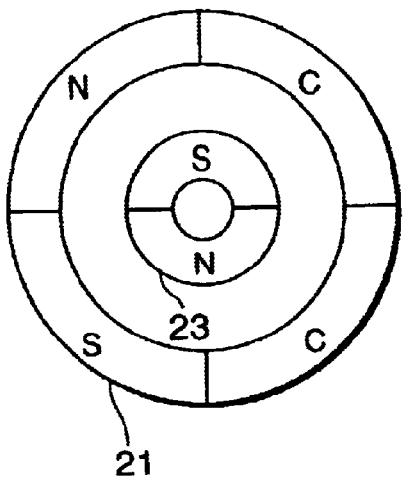
FIGS. 5A–5D are schematic cross-sectional views of the motor/generator showing variations of the disposition of the rotor coils and magnets of the outer rotor.

FIGS. 5A–5D show a motor/generator with a ratio of magnetic poles in the outer rotor 21 and the inner rotor 23 of 1:1 in the same manner as the motor/generator in FIG. 1. However the number and disposition of the rotor coils and the disposition of the magnet in the outer rotor 21 differs from the motor/generator shown in FIG. 1. As shown in FIG. 5A, this motor/generator divides the entire periphery of the outer rotor 21 into four sections at 90-degree intervals. The N pole and S pole of the magnet are disposed on two adjacent sections. The rotor coils are disposed on the remaining adjacent sections. In the figure, the sections in which magnets are disposed are designated by the symbols N or S depending on the magnetic pole. The sections in which rotor coils are disposed are designated by the symbol C. The magnetic pole of the excited rotor coils are designated by (N) or (S). The symbol (–) designates rotor coils which are not excited.

Figure 5B:
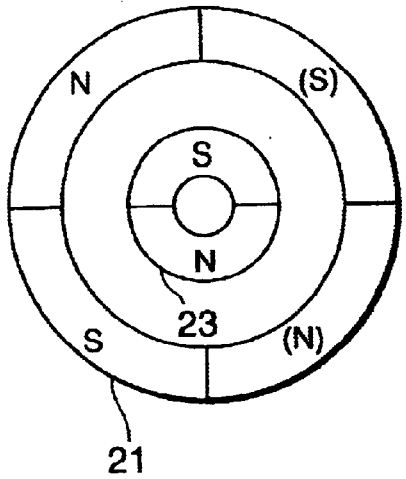
Figure 5C:
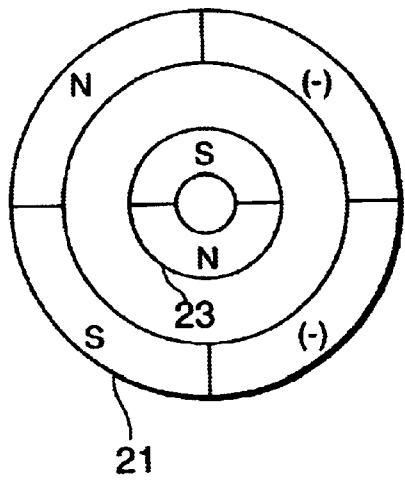

As shown in FIG. 5B, two pairs of magnetic poles are formed in the outer rotor 21 by exciting the rotor coils. Thus the ratio of magnetic poles of the outer rotor 21 and the inner rotor 23 becomes 2:1. On the other hand, when the rotor coils are not excited, as shown in FIG. 5C, only half of the circular periphery which comprises the magnet of the outer rotor 21 is magnetized and the remaining half of the circular periphery comprising the rotor coil is not magnetized. In this case, the ratio of the magnetic poles of the outer rotor 21 and the inner rotor 23 is 1:1.

Figure 5D:
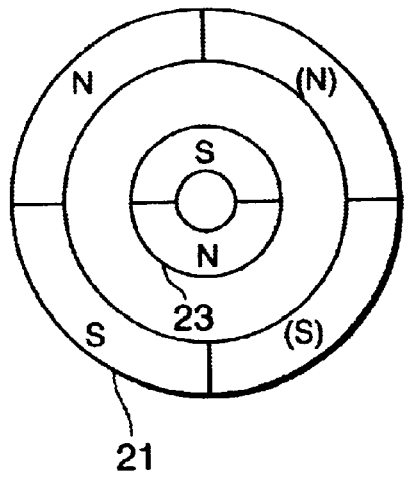

In FIG. 5D, the entire periphery of the outer rotor 21 is magnetized with half the periphery comprising the N pole and the other half comprising the S pole. This is achieved by supplying an exciting current in an opposite direction to that in FIG. 5B to the rotor coils of the outer rotor 21. Thus the ratio of magnetic poles of the outer rotor 21 and the inner rotor 23 is also 1:1.

Since the strength of magnetic coupling increases as the length of the magnetized section increases, the situation in FIG. 5C or the situation in FIG. 5D may be chosen according to the required strength of the magnetic coupling. When the rotors 21, 23 are driven as a motor or generator, an unintended rotation of the rotors 21 and 23 is prevented by setting the ratio of the magnetic poles to 2:1.

Figure 6:
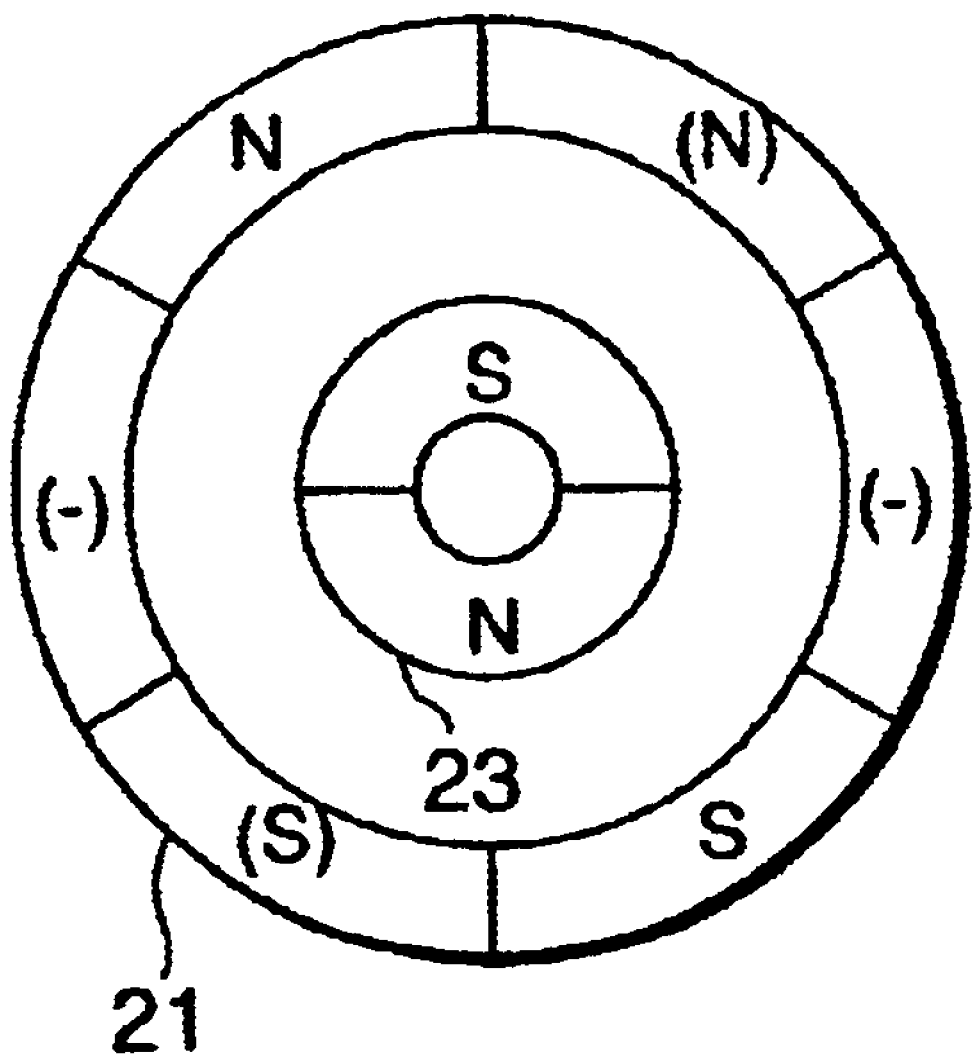
FIG. 6 is a schematic cross-sectional view of the motor/generator showing a variation in the excitation state of the rotor coils.

FIG. 6 shows the magnetic poles formed in the motor/generator shown in FIG. 1 when only the rotor coils B and D are excited and the rotor coils A and D are not excited.

Such a situation is realized by varying the configuration of the DC circuit to excite the rotor coils A–D. Although the ratio of magnetic poles of the outer rotor 21 and the inner rotor 23 in the figure is 1:1, it can be changed to 2:1 by reversing the direction of the DC current supplied to the rotor coils. Thus it is possible to vary the ratio of the magnetic poles of the outer rotor 21 and the inner rotor 23 by this arrangement of the DC current supply.

Figure 7A:
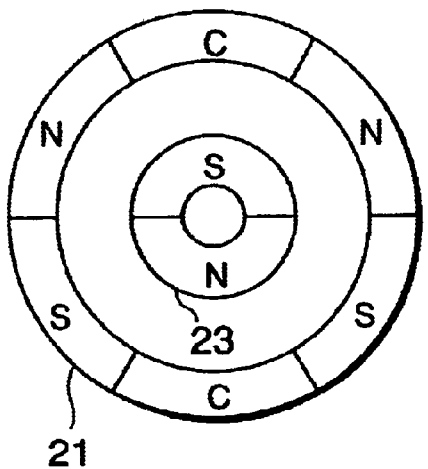
FIGS. 7A–7D are schematic cross-sectional views of the motor/generator showing further variations of the disposition of the rotor coils and the magnets of the outer rotor.
Figure 7B:
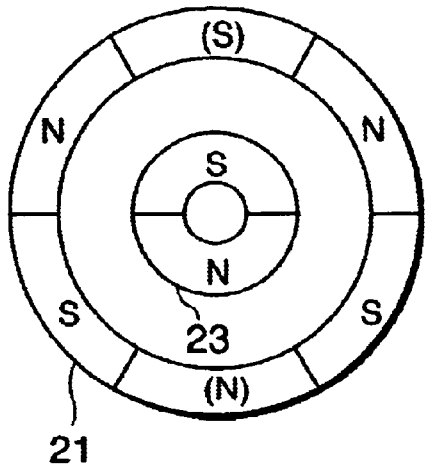
Figure 7C:
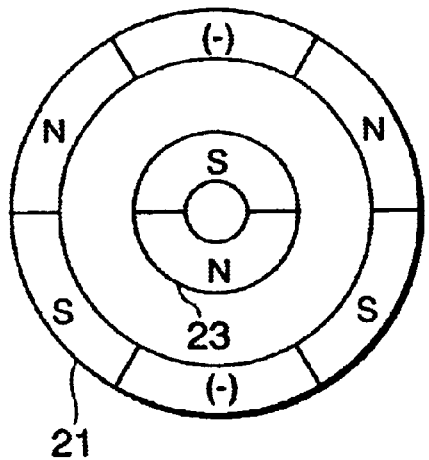
Figure 7D:
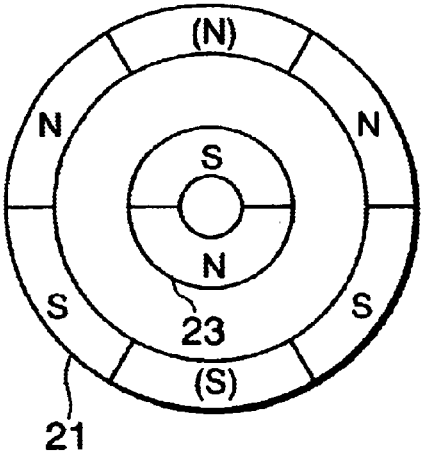

FIGS. 7A–7D show a motor/generator in which the ratio of the magnetic poles of the outer rotor 21 and the inner rotor 23 is 1:1. Two rotor coils are provided in the outer rotor 21. When the rotor coils are excited as shown in FIG. 7B, the ratio of the magnetic poles of the outer rotor 21 and the inner rotor 23 is 3:1. On the other hand, when an exciting current is supplied in an opposite direction to the rotor coils, half of the circular periphery of the outer rotor 21 becomes the N pole and the other half becomes the S pole as shown in FIG. 7D. In this case, the ratio of the magnetic poles of the outer rotor 21 and the inner rotor 23 is 1: When the rotor coils are not excited, the two N poles of the outer rotor 21 sandwich one of the non-excited rotor coils and the two S poles sandwich another non-excited rotor coil. The outer rotor 21 also has two magnetic poles in this case and the ratio of the magnetic poles of the outer rotor 21 and the inner rotor 23 is 1:1.

In a motor/generator shown in FIGS. 8A–8F, the entire periphery of the outer rotor 21 is divided into eight equal sections. The N pole and the S pole of the magnet are disposed in two of those sections. The rotor coils are disposed in the remaining six sections. In this motor/generator, it is possible to set the ratio of the magnetic poles of the outer rotor 21 and the inner rotor 23 to 4:1 as shown in FIG. 8B by exciting the rotor coils. On the other hand, when the rotor coils are not excited, the ratio of the magnetic poles of the outer rotor 21 and the inner rotor 23 is 1:1 as shown in FIG. 8C. Furthermore as shown in FIGS. 8D–8F, it is possible to set the ratio of the magnetic poles of the outer rotor 21 and the inner rotor 23 to a ratio of 1:1 under various exciting states of the rotor coils. Since the strength of the magnetic coupling varies according to the exciting state of the rotor coils, the stator coils may be selectively excited according to the required strength of the magnetic coupling.

In the same manner as the motor/generator shown in FIGS. 8A–8F, FIGS. 9A–9D show a motor/generator in which the entire periphery of the outer rotor 21 is divided into eight sections. Two N poles and the S poles of the magnet are disposed in four sections with the rotor coils being disposed in the remaining four sections.

Figure 9A:
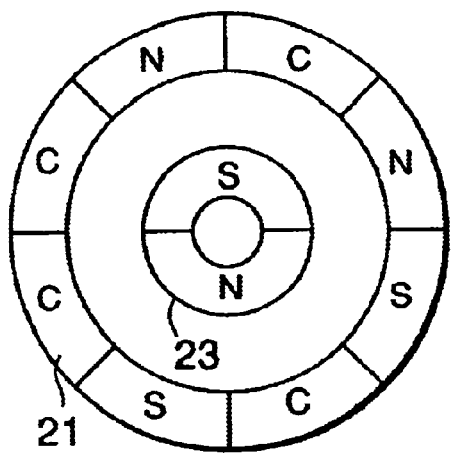
FIGS. 9A–9D are schematic cross-sectional views of the motor/generator showing yet further variations of the disposition of the rotor coils and the magnets of the outer rotor.
Figure 9B:
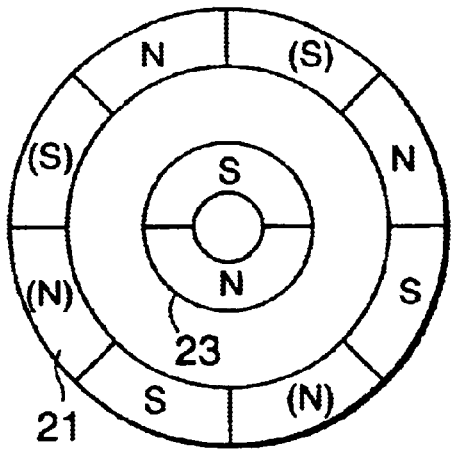
Figure 9C:
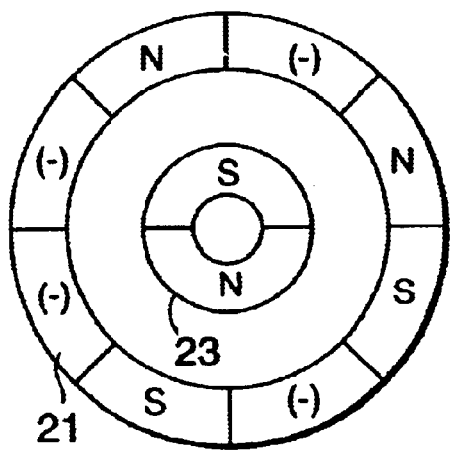
Figure 9D:
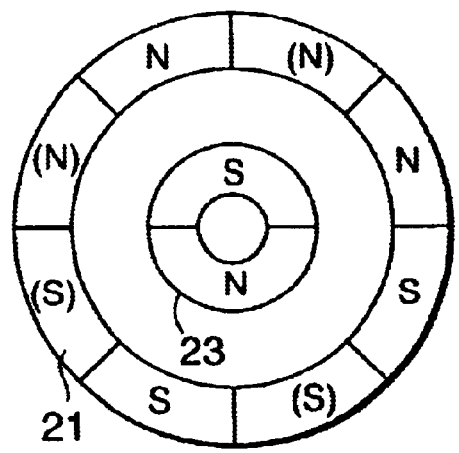

As shown in FIG. 9B, four pairs of the magnetic poles are formed in the outer rotor 21 by exciting the rotor coils. Thus the ratio of magnetic poles of the outer rotor 21 and the inner rotor 23 becomes 4:1. On the other hand, when all the rotor coils are not excited, since two adjacent N poles of the magnet sandwich one of the non-excited rotor coils and the two adjacent S poles of the magnet sandwich one the non-excited rotor coils, the effective number of magnetic poles in the outer rotor 21 becomes two and the ratio of magnetic poles in the outer rotor 21 and the inner rotor 23 becomes 1:1 as shown in FIG. 9C. Alternatively, as shown in FIG. 9D, half the periphery of the outer rotor 21 forms an N pole and the other half forms an S pole. This is achieved by supplying an exciting current to the rotor coils in an opposite direction to FIG. 9B. In this case also, the ratio of magnetic poles of the outer rotor 21 and the inner rotor 23 is 1:1.

FIGS. 10A–10D show a motor/generator win which the entire periphery of the outer rotor 21 is divided into ten equal sections. Two N poles and the S poles of the magnet are disposed in four of those sections. The rotor coils are disposed in the remaining six sections. One of the rotor coils is provided between two sections each corresponding to the N pole of the magnet. One of the rotor coils is provided between two sections each corresponding to the S pole of the magnet. Furthermore the N pole of the magnet is disposed at a position opposite the S pole of the magnet.

Figure 10A:
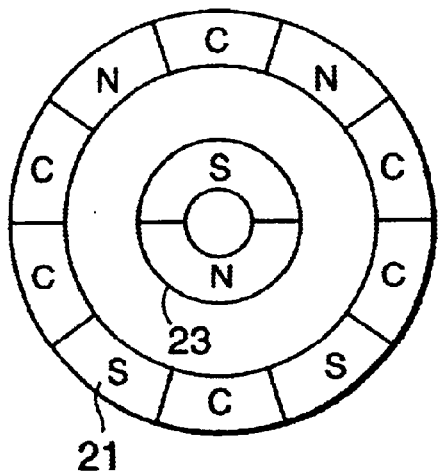
FIGS. 10A–10D are schematic cross-sectional views of the motor/generator showing yet further variations of the disposition of the rotor coils and the magnets of the outer rotor.
Figure 10B:
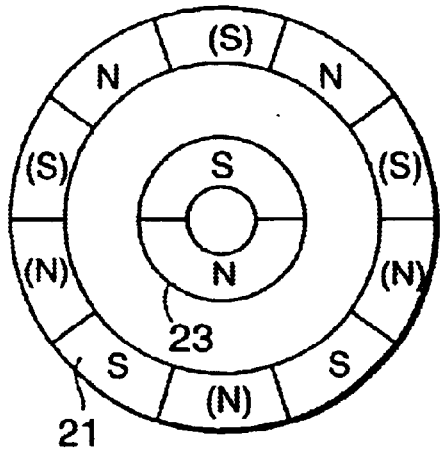
Figure 10C:
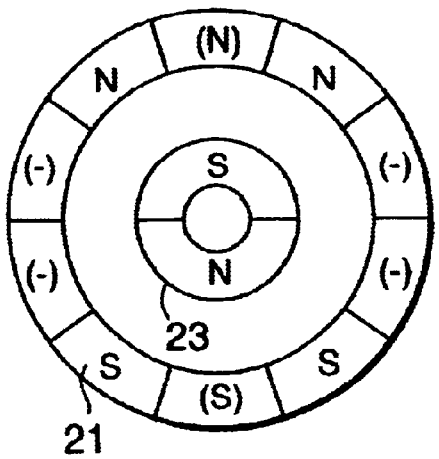
Figure 10D:
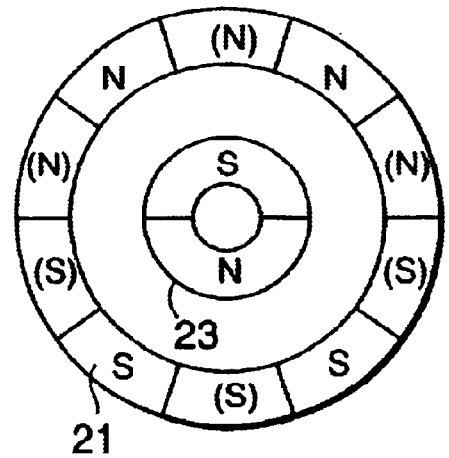

In this motor/generator, the ten sections of the outer rotor 21 form alternate N poles and S poles due to the excitation of the rotor coils as shown in FIG. 10B. As a result, five pairs of the magnetic poles are formed and the ratio of the magnetic poles of the outer rotor 21 and the inner rotor 23 is 5:1. On the other hand, DC current can be supplied so that a rotor coil sandwiched by the two N poles of the magnet becomes N pole and a rotor coil sandwiched by the two S poles of the magnet becomes S pole while the other rotor coils remain unexcited. Thus as shown in FIG. 10C, the ratio of the magnetic poles of the outer rotor 21 and the inner rotor 23 becomes 1:1. When an exciting current is supplied to the rotor coils in a direction opposite to that of FIG. 10B, half the periphery of the outer rotor 21 forms an N pole and the remaining half forms an S pole as shown in FIG. 10D. Thus the ratio of magnetic poles of the outer rotor 21 and the inner rotor 23 is 1:1.

In a motor/generator shown in FIGS. 11A–10D, the entire periphery of the outer rotor 21 is divided into equal ten sections and three N poles and three S poles of the magnet are disposed in six of these sections. Rotor coils are disposed in the remaining four sections. Each section in which a rotor coil is provided is sandwiched by two N poles or two S poles of the magnet. Furthermore the N poles of the magnet is disposed at a position which is opposite to the S poles of the magnet In this motor/generator, the ten sections of the outer rotor 21 comprise alternate N poles and S poles as shown in FIG. 11B due to the excitation of the rotor coils. As a result, five pairs of the magnetic poles are formed and the ratio of the magnetic poles of the outer rotor 21 and the inner rotor 23 is 5:1.

On the other hand, when an exciting current is not supplied to the rotor coils, the three N poles of the magnet sandwich non-excited rotor coils in half of the circular periphery of the outer rotor 21 as shown in FIG. 11C. In the remaining half of the circular periphery of the outer rotor 21, the three S poles of the magnet sandwich non-excited rotor coils. In this situation, the ratio of the magnet poles of the outer rotor 21 and the inner rotor 23 is 1:1. When an exciting current is supplied to the rotor coils in a direction opposite to that of FIG. 11B, half the periphery of the outer rotor 21 is all N poles and the remaining half is all S poles as shown in FIG. 11D. Thus the ratio of magnetic poles of the outer rotor 21 and the inner rotor 23 is 1:1.

In the motor/generator shown in FIGS. 12A–12E, the inner rotor 23 is divided into four sections of 90 degrees.

Magnets are disposed so that each part forms alternate N poles and S poles. The entire periphery of the outer rotor 21 is divided into twelve equal sections. Two N poles and two S poles of the magnet are disposed in four sections with rotor coils being disposed in the remaining eight sections. The two N poles of the magnet are opposed at 180 degrees and in the same manner the two S poles of the magnet are also opposed at 180 degrees. The N poles and the S poles are disposed about the two parts in which the rotor coils are disposed.

Figure 12A:
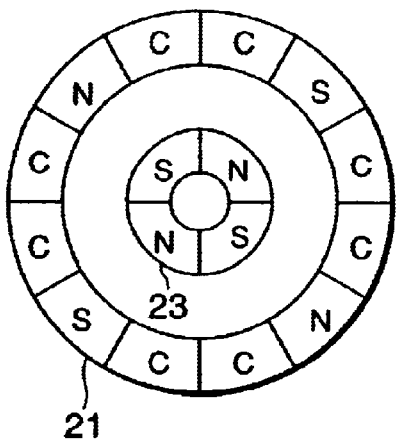
FIGS. 12A–12E are schematic cross-sectional views of the motor/generator showing yet further variations of the disposition of the rotor coils and the magnets of the outer rotor.
Figure 12B:
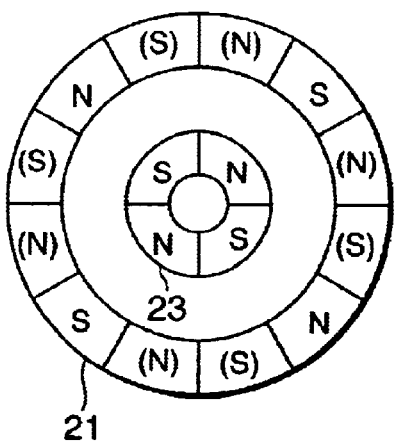
Figure 12C:
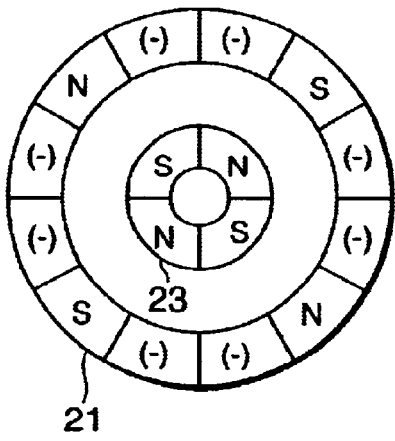

In this motor/generator, the twelve parts of the outer rotor 21 comprise alternate N poles and S poles as shown in FIG. 12B due to the excitation of the rotor coils. As a result, six pairs of magnetic poles are formed on the outer rotor 21 and since the inner rotor 23 has two pairs of magnetic poles, the ratio of the magnetic poles of the outer rotor 21 and the inner rotor 23 is 3:1. On the other hand, when an exciting current is not supplied to any of the rotor coils, N poles and S poles of the magnet are disposed alternately at 90 degree intervals on the outer rotor 21 as shown in FIG. 12C. Thus two pairs of magnetic poles are formed and the ratio of the magnet poles of the outer rotor 21 and the inner rotor 23 is 1:1.

Figure 12D:
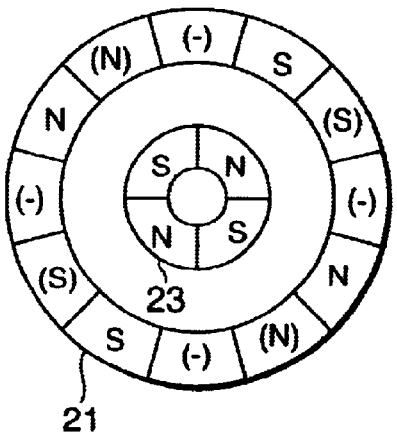

FIG. 12D shows the distribution of magnetic poles when only one of the two rotor coils adjacent to the N pole of the magnet is excited to become an N pole and an exciting current is not supplied to the other rotor. In the same manner, only one of the two rotor coils adjacent to the S poles of the magnet is excited to become an S pole and an exciting current is not supplied to the other rotor. In the same manner as FIG. 12C, the outer rotor 21 has two pairs of magnetic poles and the ratio of the outer rotor 21 and the inner rotor 23 is 1:1.

Figure 12E:
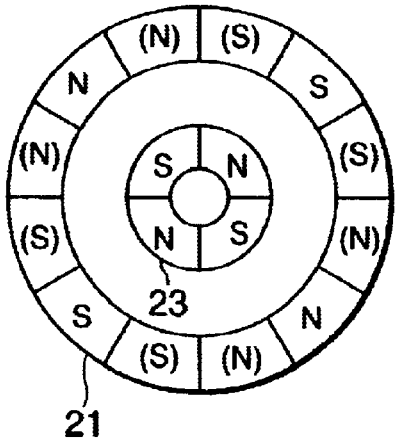

FIG. 12E shows the distribution of magnetic poles when an exciting current is supplied to the rotor coils in an opposite direction to that shown in FIG. 12B. In this case, half the periphery of the outer rotor 21 is all N poles and the remaining half is all S poles. Thus the ratio of the outer rotor 21 and the inner rotor 23 is 1:1.

As can be understood from the motor/generator shown in FIGS. 12A–12D, the magnetic pole number of the inner rotor 23 is not limited to one.

Providing that the number of magnets in the first rotor is 2L, the number of magnets in the second rotor is 2M and the number of the rotor coils is 2N, while L, M and N are natural numbers, the numbers 2L, 2N of the magnets in the first and second rotors and the number 2N of the coils of the second rotors are determined so that the magnetic pole number ratio between the first rotor and the second rotor is 1:1. On the other hand, the magnetic pole number of the second rotor is M+N when all the rotor coils are energized to have a different magnetic pole from that of an adjacent magnet.

A second embodiment of this invention will be described referring to FIG. 13 and FIGS. 14A and 14B.

Figure 13:
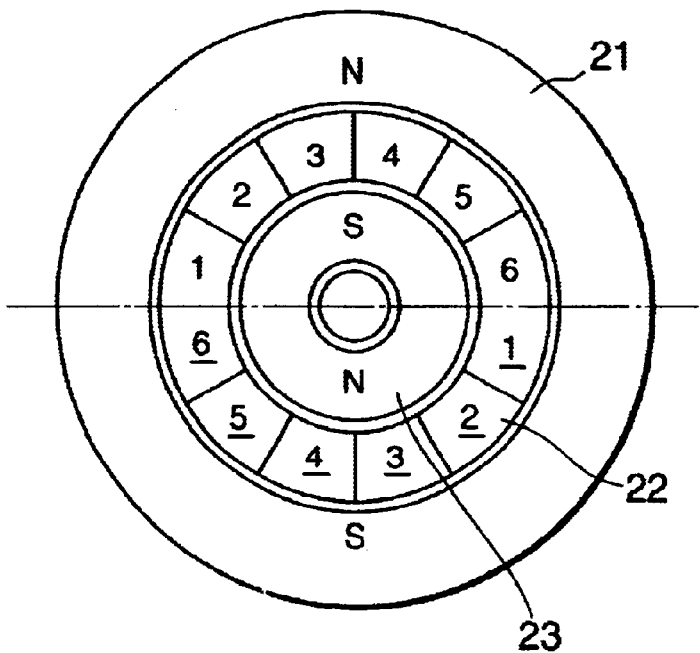
FIG. 13 is a schematic cross-sectional view of a motor/generator according to a second embodiment of this invention.

A motor/generator shown in FIG. 13 is provided with an inner rotor 23 and a stator 22 that are identical to those shown in FIG. 1. An outer rotor 21 is provided with a magnet in which one half of a circular periphery is the N pole and the remaining half is an S pole. The outer rotor 21 is not provided with rotor coils.

Figure 14A:
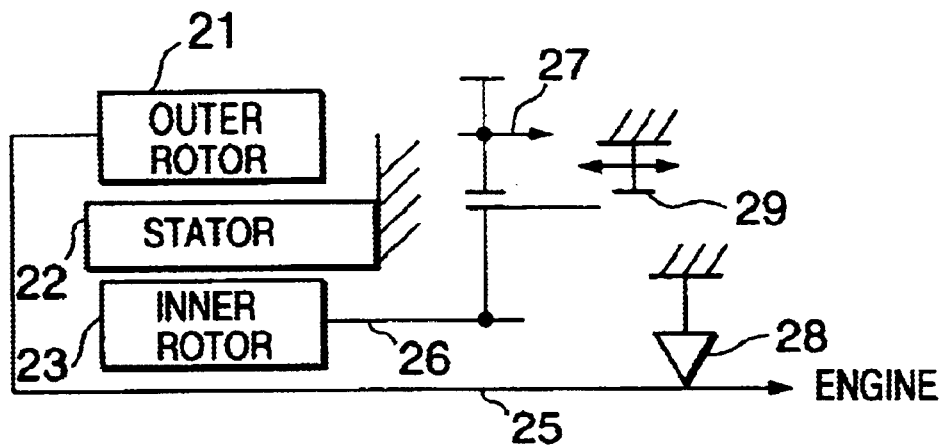
FIGS. 14A and 14B are schematic diagrams of vehicle drive devices using the motor/generator according to the second embodiment of this invention.
Figure 14B:
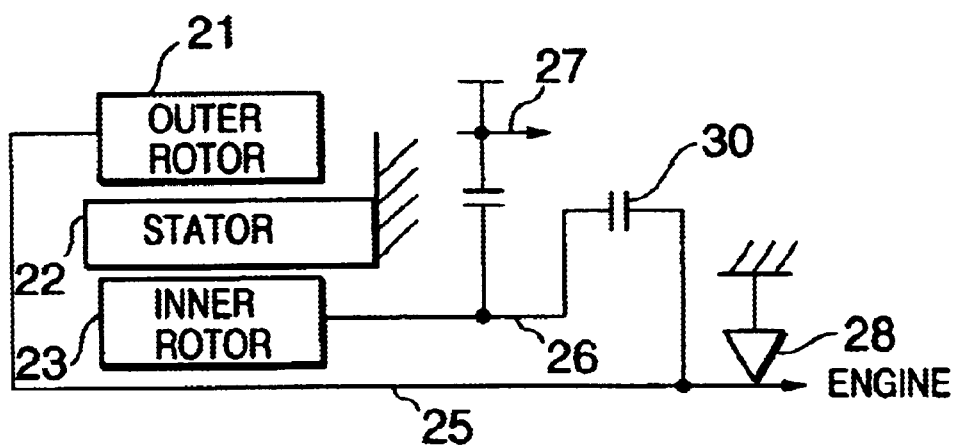

Referring to FIG. 14A, a one-way clutch 28 is provided between the engine and a rotation shaft 25 of the outer rotor 21 to prevent rotation of the outer rotor 21 in a specific direction. A locking mechanism 29 such as a parking brake or a parking gear is provided in order to prevent rotation of a propeller shaft 27 which is connected to a rotation shaft 26 of the inner rotor 23.

A control circuit of the motor/generator is adapted to allow engine start-up by operation of the outer rotor 21 only when the lock mechanism 29 is in the ON position, that is to say, only when the rotation of the propeller shaft 27 is prevented.

The ratio of the magnetic poles of the outer rotor 21 and the inner rotor 23 in this motor/generator is 1:1 and thus it is possible to use the motor/generator as a magnetic coupling.

When a fixed alternating current is supplied to the stator coils 1–6 of the stator 22, the outer rotor 21 and the inner rotor 23 rotate. Whether the outer rotor 21 and the inner rotor 23 rotate in positive rotation mode or in reverse rotation mode depends on the phase difference α of the outer rotor 21 and the inner rotor 23 as described above. However, in this motor/generator, when the rotation of the outer rotor 21 and the inner rotor 23 stops, they stop at a relative position where the N pole and S pole, and the S pole and the N pole are opposed as shown in FIG. 13 due to attraction of opposite poles. Thus when an alternating current is supplied again to the stator coils 1–6, the motor/generator rotates in reverse rotation mode as long as the stationary position is not forcibly varied.

It is possible to rotate only one rotor 21(23) by supplying an alternating current to the stator coils 1–6 by the combination of reverse rotation mode with the one-way clutch 28 and the lock mechanism 29.

The direction of the rotation of the rotor 21(23) depends on the direction of rotation of the rotating magnetic fields formed by the stator coils 1–6.

When the vehicle is started from a position in which both the engine is stopped and the vehicle is stationary, the lock mechanism is placed in the OFF position, an alternating current is supplied to the stator coils 1–6 and the inner rotor 23 is rotated in a positive direction for example. If the direction of rotation prevented by the one-way clutch 28 is pre-set so that the rotation in a negative direction of the outer rotor 21 is prevented, only the inner rotor 23 rotates. In contrast, when the engine is started when the vehicle is stationary, an alternating current is supplied to the stator coils 1–6 and the outer rotor 21 is rotated in the direction of rotation permitted by the one-way clutch 28, i.e., in the positive direction. By preventing the rotation of the inner rotor 23 by the lock mechanism 29, only the outer rotor 21 rotates.

In this manner, while the ratio of the magnetic poles of the outer rotor 21 and the inner rotor 23 is maintained at 1:1, it is still possible to cause only one of the outer rotor 21 and the inner rotor 23 to rotate while the other rotor is prevented from rotating.

As a variation of this embodiment, it is possible to connect the engine and the rotation shaft 26 of the inner rotor 23 by a lockup clutch as shown in FIG. 14. The lockup clutch 30 comprises an electromagnetic clutch which engages and disengages in response to an outside signal. When the operation of the motor/generator is stopped, the lockup clutch 30 is engaged at a phase difference α when the outer rotor 21 and the inner rotor 23 are stopped is equal to π. Thus relative rotation of the outer rotor 21 and the inner rotor 23 can be prevented from occurring during the period when the motor/generator is not operated. The contents of Tokugan 2000-7431, with a filing date of Jan. 17, 2000 in Japan, and Tokugan 2000-383547 with a filing date of Dec. 18, 2000 in Japan are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, this invention has been described as applied to a motor/generator with a triple-layered structure of inner rotor, stator and outer rotor, it is possible to apply the invention to a motor/generator disposing two rotors coaxially.

In other words, this invention can be applied to any type of synchronous motors provided with two rotors sharing a stator coil, which drives the two rotors by passing a composite current through stator coils.

The embodiments of this invention in which an exclusive property or privilege is claimed are defined as follows:

What is claimed is:

1. A motor/generator comprising:
   a first rotor provided with a plurality of magnetic poles by a magnet;
   a second rotor provided with a plurality of magnetic poles by a magnet and a plurality of rotor coils, the first rotor and the second rotor being coaxially and concentrically disposed and rotating independently from each other; and
   a stator provided with a plurality of stator coils which is configured to apply a first rotational force on the first rotor and a second rotational force on the second rotor to cause the first rotor and the second rotor to rotate independently from each other, when a composite polyphase alternating current is supplied to the stator coils.

2. The motor/generator as defined in claim 1, wherein the number of magnetic poles in the magnet provided in the first rotor is equal to the number of poles in the magnet provided in the second rotor.

3. The motor/generator as defined in claim 1, wherein the composite polyphase alternating current comprises an alternating current forming a rotating magnetic field applying a rotational force on the first rotor and an alternating current forming a rotating magnetic field applying a rotational force on the second rotor.

4. The motor/generator as defined in claim 1, wherein the motor/generator further comprises an exciting circuit which excited a part of the rotor coils by supplying a first exciting current to the part of the rotor coils to vary the ratio of magnetic poles of the first rotor and the second rotor to a ration other than 1:1.

5. The motor/generator as defined in claim 4, wherein the motor/generator functions as a magnetic coupling in which one of the first rotor and second rotor rotates the other of the first rotor and the second rotor in synchronization by suspending the excitation of the part of the rotor coils by the exciting circuit and suspending the supply of the composite polyphase alternating current to the stator coils.

6. The motor/generator as defined in claim 4, wherein the second rotor is provided with a plurality of pairs of the rotor coils and the motor/generator functions as a magnetic coupling in which one of the first rotor and second rotor rotates the other of the first rotor and the second rotor in synchronization by exciting a specific pair of the rotor coils by a second exciting current and suspending the supply of the composite polyphase alternating current to the stator coils.

7. The motor/generator as defined in claim 4, wherein the motor/generator functions as a magnetic coupling by which one of the first rotor and second rotor rotates the other of the first rotor and the second rotor in synchronization by supplying a third exciting current to the part of the rotor coils which flows in a direction opposite to the first exciting current, and suspending the supply of the composite polyphase alternating current to the stator coils.

8. The motor/generator as defined in claim 4, wherein the second rotor is provided with a plurality of pairs of the rotor coils and the motor/generator functions as a magnetic coupling which varies a coupling force according to an excitation state of the plurality of pairs of the rotor coils.

9. The motor/generator as defined in claim 4, wherein the plurality of the rotor coils are connected in series and are excited by a direct current.

10. The motor/generator as defined in claim 9, wherein the motor/generator further comprises two collector rings which supply an exciting current to the pair of the rotor coils.

11. A motor/generator comprising:
    a first rotor provided with a plurality of magnetic poles by a magnet;
    a second rotor provided with the same number of magnetic poles as the first rotor by a magnet, the first and second rotors being coaxially and concentrically disposed and rotatable independently of each other;
    a stator provided with a plurality of stator coils applying a rotational force on the first rotor and the second rotor when a composite polyphase alternating current is supplied to the stator coils; and
    a device which limits the rotation of the second rotor in a specified direction.

12. The motor/generator comprising,
    a first rotor provided with a plurality of magnetic poles by a magnet;
    a second rotor provided with the same number of magnetic poles as the first rotor by a magnet;
    a stator provided with a plurality of stator coils applying a rotational forc on the first rotor and the second rotor when a composite polyphase alternating current is supplied to the stator coils, and
    a device which limits the rotation of the second rotor in a specified direction,
    wherein the first rotor is connected to a drive wheel of a vehicle, the second rotor is connected to en engine mounted in the vehicle, and the rotation limitation device comprises a one-way clutch which is interposed between the engine and the second rotor.

13. The motor/generator as defined in claim 12, wherein the motor/generator further comprises a device which locks the rotation of the first rotor.

14. The motor/generator as defined in claim 12, wherein the motor/generator further comprises a lock-up clutch which limits relative rotation of the first rotor and the second rotor.

* * * * *